July 22, 1952      H. A. VAN DYKE      2,603,835
ELECTRIC TUBE VULCANIZER
Filed Oct. 29, 1948

INVENTOR.
HENRY A. VAN DYKE
BY Hudson, Boughton,
Williams, David & Hoffmann.
ATTORNEYS Patented July 22, 1952

2,603,835

UNITED STATES PATENT OFFICE 2,603,835

ELECTRIC TUBE VULCANIZER

Henry A. Van Dyke, China Lake, Calif.

Application October 29, 1948, Serial No. 57,204

5 Claims. (Cl. 18—18)

The present invention is directed to a vulcanizer wherein an electric heating element is provided for furnishing the required heat.

Without any intended limitation, the embodiment of the invention herein described is more particularly directed toward a vulcanizer adapted and arranged for the vulcanizing of patches to rubber articles of the type represented by inner tubes for automobile tires, rubber bags and the like.

An object of the invention is to provide a vulcanizing unit which comprises an electric heating element having in association therewith a metal plate adapted to be placed in heat exchange relation with the heating element, to which plate is adhered a rubber patch and associated with said unit a mechanism whereby the electric circuit to the heating member may be closed and at an appropriate time automatically opened when the heat supplied by the heating element has proceeded to the predetermined extent.

Another object of the invention is the association with the vulcanizing unit of a switch mechanism which may be manually moved to operative or closed circuit position and held in such position through cooperation of at least a portion of that mechanism with a metal portion of the vulcanizing unit, usually the plate which carries the patch and the switch automatically opening when the heat generated by the electric heating element has attained a predetermined limit.

Another object of the invention is to provide a vulcanizing unit associated with a clamp for cooperation with the electric vulcanizing unit wherein the clamp carries a switching mechanism for controlling the current to the heating element of the vulcanizing unit, such electrical connection being maintained in cooperation with the plate carrying the patch and release of said mechanism being accomplished when the desired extent of the development of heat has been obtained.

Referring to the drawings—

Fig. 5 is a section on the line 5—5 of Fig. 2;

Fig. 6 is a top plan view of the member which carries one of the contact members of a switch.

Figures 3, 4:
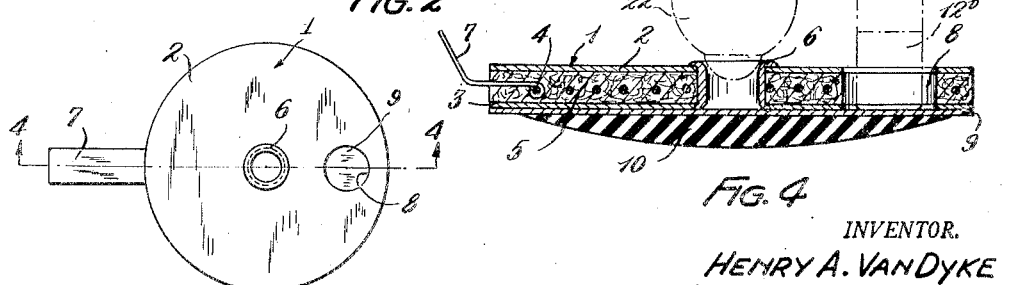
Fig. 3 is a top plan view of the heating element of the vulcanizing unit.
Fig. 4 is a section on the line 4—4 of Fig. 3.

In the drawings and more particularly referring to Fig. 4, the vulcanizer comprises an electrical heating unit which is generally represented by 1. This unit has a top plate 2 and a bottom plate 3 between which is located resistance wire 4 which is imbedded in suitable nonconductive material as represented at 5. The assembly of parts which has just been described may be conveniently held in assembled relationship by means of a hollow rivet 6 which at its extremities has portions thereof extruded outwardly so as to engage with the plates 2 and 3 respectively, thus holding the structure together. The member 6 is in the present disclosure made of electric conducting material.

One end of the resistance coil 4 is associated with a terminal 7 while the other end of the resistance coil is electrically connected with the member 6. Extending through the plates 2 and 3, as well as the material which occupies the space between these plates is an opening which is indicated at 8. The purpose of this opening will be later described.

The reference character 9 indicates a plate made of metal to which there is adhered on one surface thereof a piece of rubber patching material as indicated at 10. The size of the plate 9 is such as to be coextensive with the undersurface of the electric heating unit and the plate 9 extends beneath the opening 8. Obviously, when the plate 9 is in engagement with the heating unit and when the same is energized, the plate is in heat exchange relation with the heating unit.

In the operation of the electric heating unit the terminal 7 is connected with an electric circuit and the member 6 is adapted to be associated with a terminal that is connected with the same electric circuit. The control of this electric circuit as it is associated with the vulcanizing unit is an important part of the invention herein disclosed.

The electric circuit which supplies the current to the electric heating element is controlled by a switch which is generally represented at 11. The switch is operated by a plunger 12. This movable member or plunger is at least in part made of a metal which is magnetized, specifically the portion marked 12a is the magnetized portion. The upper portion may be of fiber or any suitable material. Attached to the magnetized portion 12a is an extension 12b which is made of what in the art is known as "Curie metal," to which reference will later be made.

Associated with the plunger 12 is a spring 13 which bears against a stop 14 carried by the plunger and which at the opposite end thereof is associated with the one element of the switch mechanism 11. When the heating element is assembled in a suitable clamp, together with the material to be patched, the opening 8 in the heating element of the vulcanizing unit is positioned so that the plunger 12 may be pushed through the opening 8. When the plunger is depressed the "Curie metal," which is magnetically permeable within certain ranges of temperature, will contact with the plate 9 and be caused to adhere to said plate against the action of the spring 13 and the plunger in so moving closes the switch 11.

When the electric heating element is energized and generates heat, heat will be, by conduction, passed to the plate 9 and so to the rubber patching material 10 which adheres to the plate 9 and in due time the vulcanization of the rubber patch to the tube will be accomplished. When the heat has reached a predetermined maximum, the Curie metal will lose its magnetic properties, whereupon the spring 13 and the member 26 of the switch become effective to move the plunger 12 and effect the opening of the switch 11 which controls the electric circuit to the heating unit.

The so-called "Curie metal," which might more properly be designated as an alloy which exhibits the "Curie effect," is well known in the art and is commercially obtainable. An alloy of nickel and iron is a common form of "Curie metal."

This Curie metal has the property of being magnetically permeable within a range of temperature which is dependent upon the percentage of nickel as against the percentage of iron. When in a given Curie metal alloy the temperature of the Curie metal becomes sufficiently high the Curie metal becomes nonmagnetically permeable, but when the metal becomes cool its magnetic properties return. Therefore, by choosing a proper alloy of such elements that will produce what is known as Curie metal there can be effected a control of the temperature at which the Curie metal will become nonmagnetic.

In the present instance, and in accordance with the structure which has heretofore been described, the matter of holding the switch 11 in its closed position is a function not only of the magnetic properties of the Curie metal associated with the plunger 12, but also a function of what is known as the loading of the spring 13, that is to say a certain degree of compression of the spring is effected when the plunger 12 is depressed. Therefore, it is not a critical matter that the Curie metal should be so chosen as to lose its magnetic effect at the precise elevation of the temperature which would be found desirable in connection with the vulcanizing operation.

The loss in magnetic property due to heating of the Curie metal is a progressive one. As the heat of the metal advances, the magnetic properties diminish. Therefore, if it were desired to open the electric circuit at a time when the heat developed by the heating unit of the vulcanizer has reached a temperature of 350°, the Curie metal itself might not entirely lose its magnetism until a temperature above that which has been mentioned. However, since the action of the spring 13 tends to expand from its compressed condition, it is entirely possible to calibrate the spring such that it will be effective to elevate the plunger 12 at the proper time, even though the magnetic properties of the Curie metal have not entirely disappeared. Therefore, the matter of determining the loading of the spring for proper cooperation with any selected Curie metal is a matter of engineering.

In the present instance the mechanism whereby the closing and opening of the circuit is effected is associated with the clamping mechanism used in connection with the vulcanizing unit when such unit is assembled and arranged for performing the vulcanizing operation.

As shown in the drawing, the clamp comprises a base portion 15 which at its end supports a pad 16 for the reception of the article to be repaired, such for instance as indicated at 17. Pivoted at the end of the base opposite to that which has just been described is an arm 18. This arm may be moved toward and from the base portion by means of a screw 19 operated by a handle 20 and preferably there is associated with the screw 19 a spring 21 which contacts with the portion 15 of the clamp as well as the underside of the arm 18. The function of the spring will be readily understood.

At the end of the arm 18 remote from the pivot, the arm is provided with a portion 22 which is adapted to cooperate with the hollow rivet 6 of the heating element. Therefore, when the electric heating element and plate are properly associated and placed upon the material to be repaired, the portion 22 just referred to positions the vulcanizing unit and holds it in its proper position.

Figure 2:
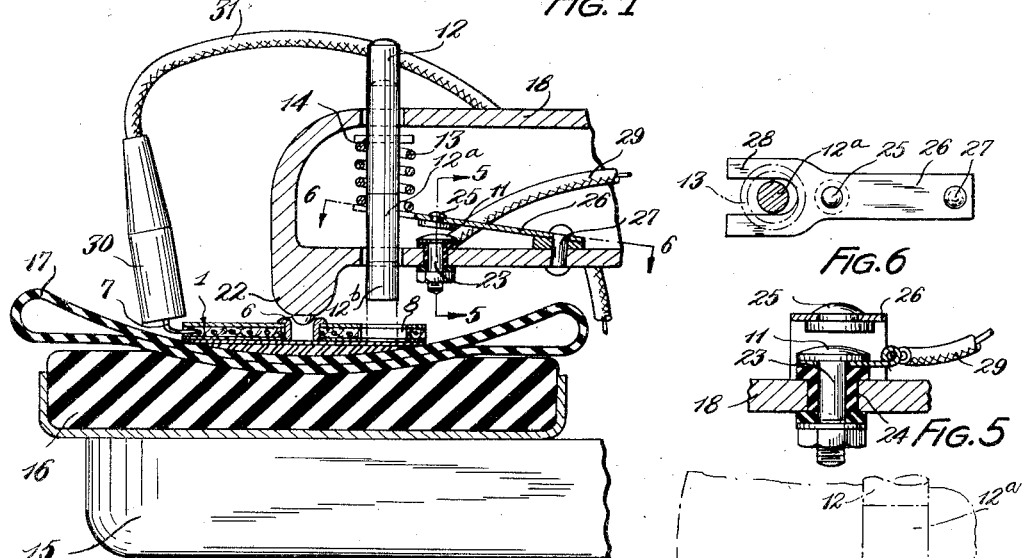
Fig. 2 is a view partly in elevation and partly in section of portions of the vulcanizing unit, portions of the clamp and parts associated therewith.

The switch mechanism as shown, more particularly in Fig. 2, comprises a terminal 23 which is shown in more detail in Fig. 5, the terminal being insulated by proper insulating material as indicated at 24. The cooperating terminal as indicated at 25 in Fig. 2 is carried by a resilient member 26 which is mounted in any suitable manner with respect to the arm 18 and the manner of this mounting is such that it is in electrical conductive relation to the arm 18. For this purpose a rivet 27 may be employed. The member 26 which carries the contact 25 is so mounted that the contact 25 is biased to be in an open or noncontacting position. The member 26 is bifurcated at the end, as indicated at 28 in Fig. 6, so that it straddles the plunger 12 and the bifurcated portion forms an abutment for one end of the spring 13.

It will be obvious that as the plunger 12 is depressed there will be some compression of the spring 13 but the resultant effect will be to move the contact member 25 into contact with the contact member 23. Conversely, when the plunger 12 is free to move upwardly under action of the spring 13 the engagement between contacts 23 and 25 will be broken. This latter action will take place when the Curie metal, due to the heating effect to which it is subjected when the electric heater is in operation, has lost its magnetic properties to such an extent that against spring action it will no longer adhere to the plate 9. While in the drawings, the arm 18 of the clamp is shown as hollow, it will be apparent that this is not a necessary concomitant of the structure associated therewith or its functioning as heretofore described.

It will be apparent from what has just been described that the contact 23 which is connected with a conductor 29 may be connected with any suitable source of electric current. The terminal 7 which is shown in Fig. 4 is adapted for detachable cooperation with a clip or electrode 30 which in turn is connected to a conductor 31 which likewise is adapted for connection with the same electric circuit as is the conductor 29. Obviously the voltage-ampere characteristics of the current to which the conductors 29 and 31 may be connected would be dependent upon the characteristics of the electric heating element and that in turn would bear a relation to the heat required incident to the vulcanizing operation to be performed.

In the matter of patching inner tubes, rubber bags, or similar articles, the current furnished by the usual automobile battery, which is approximately 6 volts, would be suitable. If, however, the source of current is an alternating current circuit, such for instance as a lighting circuit, then it would be necessary to employ a transformer to step down the voltage to that which would be appropriate in connection with the electric heating element that was to be used.

Inasmuch as the vulcanizer as disclosed is intended for use in vulcanizing such articles as inner tubes, rubber bags, etc., it is desirable from the viewpoint of producing a finished manufactured article that a transformer should be associated with the clamping mechanism.

Figure 1:
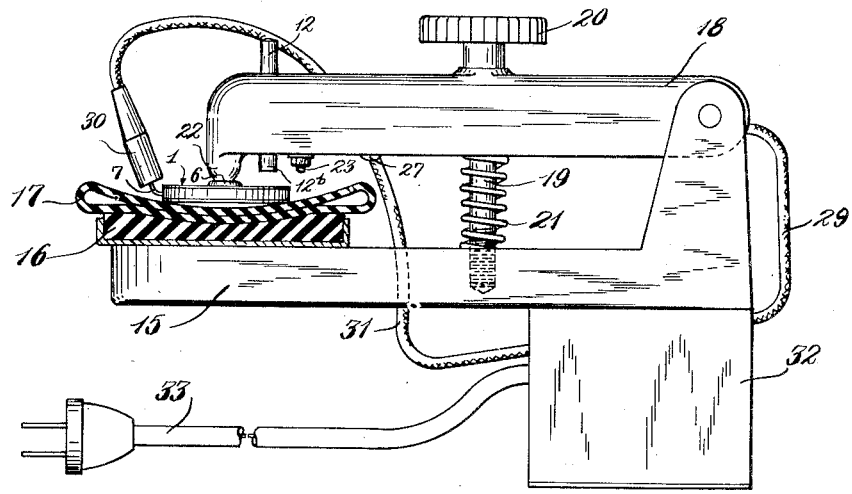
Fig. 1 shows an elevational view of an electric vulcanizing unit associated with a clamp and its appurtenances and also in part showing the operating elements for a switch mechanism.

Referring to Fig. 1, there is incorporated as a part of the clamp a housing 32 within which is located a transformer of usual characteristics and it will therefore need no description. Current to the primary of this transformer is provided by the conductor 33 and the conductors 29 and 31 are connected to the secondary within the transformer of the housing 32.

While in the previous disclosure the Curie metal which in Fig. 2 is indicated at 12b is made a part of the plunger 12 it will at once be apparent that the Curie metal may be associated with the plate 9 and when so associated or attached would be positioned so as to cooperate with the magnet associated with plunger 12 when the plunger is depressed so that the magnetic flux would pass through the Curie metal and so hold the plunger in its lower position. Likewise, it will also be apparent that the plate 9 may be made of Curie metal so that when the magnetic portion of the plunger 12 engages with the plate 9 the magnetic flux will permeate the plate 9 and hold the plunger 12 in its lowermost position. In both of the instances last recited when the heat affecting the Curie metal becomes sufficiently high it will destroy the magnetic permeable properties of the Curie metal and release the plunger 12 to be moved by the spring 13.

Reference has heretofore been made to the plunger 12 as composed of an upper portion of fiber or similar material with a portion 12a which is a magnet and also with the portion 12b which is of Curie metal.

Where the type of alloy used as a Curie metal is magnetized so as to form a permanent magnet, it may be the only metal portion used in connection with the plunger 12.

If the alloy referred to as Curie metal is permanently magnetized, then under such circumstances if the Curie metal shall be attached to the plate 9 or the plate 9 itself shall be made of Curie metal, then the plunger 12 need not itself have associated therewith a magnet, but should have a portion of iron in order to cooperate with the magnetized Curie metal in the manner heretofore indicated.

Having thus described my invention, I claim:

1. In a vulcanizer and in combination an electric heating unit adapted to be energized by an electric circuit there being an opening through the said metal unit, a metal plate adapted to contact the underside of said heating unit in heat exchange relation, a movable member mounted adjacent the heating element and having a portion thereof adapted to extend into said opening and when moved to contact the said plate, magnetic means associated with the said member whereby when the said movable member is moved into contact with the said plate the same is held magnetically thereto, a switch in said circuit and mounted adjacent to aforesaid movable member, said switch having relatively movable contacts which are normally biased to open position, cooperating means between the said movable member and one of said contacts whereby when the said movable member is moved into contact with the plate the said contacts are brought together to close the circuit, a body of Curie metal in the magnetic circuit established between the magnet and the plate whereby the magnetic adhesion before mentioned is destroyed when the Curie metal becomes heated and loses its magnetic property, and the contacts moved to open position.

2. In a vulcanizer and in combination an electric heating unit adapted to be energized by an electric circuit, there being an opening extending transversely of the heating unit, a metal plate adapted to contact the underside of the heating unit in heat exchange relation, a movable member including a magnet and a body of Curie metal attached thereto, the said Curie metal portion of the movable member being adapted to move through the opening in the heating unit; a switch operatively connected in said circuit having contacts which are normally biased to be in open position, cooperating means between the said movable means and one of said contacts whereby, when the movable member is moved so that the Curie metal portion thereof engages with the said plate and is magnetically held thereto, the contacts of the switch are brought into engaging position, the magnetic attraction between the movable member and the plate being destroyed when the Curie metal is heated to a point where it loses its magnetic property and the contacts moved to noncontacting position.

3. A vulcanizing apparatus comprising a clamp having a base portion and a movable arm mounted upon said base portion, an electric heating unit adapted to be connected in an electric circuit, said unit having an opening transversely therethrough, a metal plate adapted to engage with the underside of said unit and in heat exchange relation therewith, said heating unit and plate being positioned between the base of said clamp and an end of the movable arm, a movable member mounted upon the said arm and adapted to extend through the opening in the heating element when the said member is moved, said movable member comprising a magnetic portion and associated therewith a body of Curie metal whereby when the movable member is moved the Curie portion of said member will engage with the aforesaid plate and be magnetically held thereto, a switch mounted upon the clamp adapted to be included in the aforesaid electric circuit and having contacts normally biased to open position, cooperating means between the said movable member and one of the switch members whereby when the movable member is moved the contacts are brought into engaged position, and means for moving the said movable member out of contact with the plate and separating the said contacts of the switch when the Curie metal becomes heated and loses its magnetic property.

4. In a vulcanizer and in combination an electric heating unit adapted to be energized by an electric circuit, a rubber patch-carrying plate of Curie metal adapted to contact the underside of the heating unit in heat exchange relation, a switch in said circuit having contacts which are normally biased to be in open position, means including a body of magnetically permeable material movable into contact with the said plate of Curie metal and magnetically held to said plate when so moved, cooperating means associated with the first mentioned means and the switch to move the contacts of the switch to closed position when the first mentioned means is moved into contact with the said patch-carrying plate whereby the magnetic adhesion between the plate and said movable member is destroyed when the Curie metal becomes heated to a predetermined point and the contacts moved to noncontacting position.

5. In a vulcanizer and in combination an electric heating unit adapted to be energized by an electric circuit, there being an opening extending transversely of the heating unit, a plate of Curie metal adapted to contact the underside of the heating unit in heat exchange relation, a movable member of magnetically permeable material having a portion adapted to move through the opening in the heating unit, a switch operatively connected in said circuit having contacts which are normally biased to be in open position, cooperating means between the said movable means and one of said contacts whereby when the movable member is moved so that the said movable member engages with the plate of Curie metal and is magnetically held thereto, the contacts of the switch are brought into engaging position, the magnetic attraction between the movable member and the plate of Curie metal being destroyed when the Curie metal is heated to a point where it loses its magnetic quality and the contacts moved to noncontacting position.

HENRY A. VAN DYKE.

REFERENCES CITED

The following references are of record in the file of this patent:

UNITED STATES PATENTS

| Number | Name | Date |
|---|---|---|
| 822,323 | Thomson | June 5, 1906 |
| 852,326 | Harley | Apr. 30, 1907 |
| 1,499,112 | Lippincott | June 24, 1924 |
| 1,930,174 | MacLennan | Oct. 10, 1933 |
| 2,075,705 | Crowley | Mar. 30, 1937 |
| 2,082,551 | Raney | June 1, 1937 |
| 2,207,871 | Myers | July 16, 1940 |
| 2,437,488 | Ulanet | Mar. 9, 1948 |
| 2,459,744 | Rafter | Jan. 18, 1949 |
| 2,468,239 | Saulino | Apr. 26, 1949 |